(12) United States Patent
Hashimoto et al.

(10) Patent No.: US 10,594,189 B2
(45) Date of Patent: Mar. 17, 2020

(54) ALTERNATING CURRENT GENERATOR FOR VEHICLES

(71) Applicant: DENSO CORPORATION, Kariya, Aichi-pref (JP)

(72) Inventors: Yoshinori Hashimoto, Kariya (JP); Mikio Mashino, Kariya (JP); Kouichi Akita, Kariya (JP)

(73) Assignee: DENSO CORPORATION, Kariya (JP)

( * ) Notice: Subject to any disclaimer, the term of this patent is extended or adjusted under 35 U.S.C. 154(b) by 290 days.

(21) Appl. No.: 15/535,125

(22) PCT Filed: Dec. 9, 2015

(86) PCT No.: PCT/JP2015/084563
§ 371 (c)(1),
(2) Date: Jun. 12, 2017

(87) PCT Pub. No.: WO2016/093283
PCT Pub. Date: Jun. 16, 2016

(65) Prior Publication Data
US 2017/0346367 A1 Nov. 30, 2017

(30) Foreign Application Priority Data
Dec. 10, 2014 (JP) .................................. 2014-250115

(51) Int. Cl.
*H02K 9/06* (2006.01)
*H02K 1/24* (2006.01)

(52) U.S. Cl.
CPC ............... *H02K 9/06* (2013.01); *H02K 1/243* (2013.01)

(58) Field of Classification Search
CPC .................................. H02K 9/06; H02K 1/243
(Continued)

(56) References Cited

U.S. PATENT DOCUMENTS

| 8,803,396 B2 * | 8/2014 | Vasilescu | .............. F04D 29/667 |
| | | | 310/156.66 |
| 2005/0285459 A1 * | 12/2005 | Ishida | ................... F04D 29/282 |
| | | | 310/62 |

(Continued)

FOREIGN PATENT DOCUMENTS

| JP | S64-1451 A | 1/1989 |
| JP | 2009-027788 A | 2/2009 |

OTHER PUBLICATIONS

Mar. 15, 2016 International Search Report issued in International Patent Application No. PCT/JP2015/084563.

(Continued)

*Primary Examiner* — Forrest M Phillips
(74) *Attorney, Agent, or Firm* — Oliff PLC

(57) ABSTRACT

An alternating current generator for vehicles includes a stator, a rotor having a Lundell type core and a magnetic field winding, first and second cooling fans which are fixed to an axial end surface of the Lundell type core and generate cooling air along with the rotation of the rotor, and a fan base which is disposed between the second cooling fan and the Lundell type core and regulates the cooling air. The Lundell type core includes a plurality of U-shaped clearances formed in the outer periphery of the axial end surface being circumferentially spaced apart from each other. The fan base includes a plurality of alternately and circumferentially disposed large-diameter portions and small-diameter portions, with at least one of the small-diameter portions being disposed axially confronting a U-shaped clearance.

7 Claims, 4 Drawing Sheets

(58) Field of Classification Search
USPC .............................................. 310/59, 62, 63
See application file for complete search history.

(56) References Cited

U.S. PATENT DOCUMENTS

| | | | | |
|---|---|---|---|---|
| 2015/0236560 A1* | 8/2015 | Cezario | ................... | H02K 5/10 |
| | | | | 310/59 |
| 2015/0236571 A1* | 8/2015 | Kozuka | ................ | H02K 11/046 |
| | | | | 310/59 |
| 2015/0256045 A1* | 9/2015 | White | ...................... | H02K 5/18 |
| | | | | 310/59 |
| 2015/0303765 A1* | 10/2015 | Akiyoshi | ................. | H02K 5/20 |
| | | | | 310/59 |

OTHER PUBLICATIONS

Jun. 13, 2017 International Preliminary Report on Patentability issued in International Patent Application No. PCT/JP2015/084563.

* cited by examiner

ALTERNATING CURRENT GENERATOR FOR VEHICLES

CROSS-REFERENCE TO RELATED APPLICATION

This application is based on and claims the benefit of priority from earlier Japanese Patent Application No. 2014-250115 filed on Dec. 10, 2014 the description of which is incorporated herein by reference.

TECHNICAL FIELD

The present disclosure relates to an alternating current generator for vehicles.

BACKGROUND ART

Conventional alternating current generators for vehicles that are known include generators provided with a stator about which an armature winding is wound, a rotor having a Lundell type core disposed facing the inner periphery of the stator, and a magnetic field winding wound about the Lundell type core. The Lundell type core used in such an alternating current generator is configured by combining front- and rear-side pole cores having different magnetic polarities as a pair. The pole cores are configured by a cylindrical boss portion fitted and secured to the outer periphery of a shaft, a disk portion extending in the radial direction from an axial end surface of the boss portion, and a plurality of claw poles extending from the outer periphery of the disk portion towards the boss portion along the axial direction.

For example, PTL 1 discloses a generator provided with a cooling fan and a fan base to cool the heat generated in the armature winding and the magnetic field winding. The cooling fan is fixed to an axial end surface of a Lundell type core and generates cooling air along with the rotation of the rotor. The fan base is arranged between the cooling fan and the Lundell type core and regulates the cooling air.

CITATION LIST

Patent Literature

[PTL 1] JP 2006-14516 A

SUMMARY OF THE INVENTION

Technical Problem

The Lundell type core of the rotor used in the aforementioned alternating current generator for vehicles includes U-shaped clearances which are formed at equal angular intervals in the circumferential direction. Specifically, the U-shaped clearances are formed in the outer periphery of the axial end surface of the disk portion so as to be each located between claw poles which are adjacent in the circumferential direction. Therefore, when the shaft is rotated together with the rotor, the disk portion having the U-shaped clearances serves as a fan, and the fan base disposed in the axial end surface of the Lundell type core further enhances the fan effect. In this case, the fan base regulates the cooling air blown in the axial direction and increases the cooling air. This causes a rise in the sound level of a specific frequency (pitch noise due to the claw poles) in the conventional alternating current generators for vehicles. Therefore, the quality in relation to human perception is lowered in the conventional alternating current generators for vehicles.

A countermeasure to this pitch noise may be provided by a structure in which the claw poles of the Lundell type core are arranged at uneven intervals. However, in this case, the clearances circumferentially formed between the adjacent claw poles become uneven in the pole cores having different magnetic polarities. Therefore, magnetic flux leakage occurs in those clearances which have a small circumferential width. Therefore, use of a structure including a Lundell type core with the claw poles being arranged at uneven intervals raises a problem of decreasing the effective magnetic flux that contributes to power generation, resulting in reducing electric output (causing magnetic flux leakage). To solve the problem of causing the electric output reduction, it is necessary to bring the claw poles into alignment between the pole cores having different magnetic polarities when assembling the Lundell type core. In the alternating current generator for vehicles, this raises a new problem of increasing the manufacturing cost accompanying the increase in the number of processes.

It is the object of the present disclosure to provide an alternating current generator for vehicles which minimizes increase of manufacturing cost and reduces pitch noise.

Solution to Problem

An alternating current generator for vehicles of the present disclosure includes a stator (20) about which an armature winding (22) is wound, a rotor (30) including a Lundell type core (31) disposed facing the inner periphery of the stator and a magnetic field winding (37) wound about the Lundell type core, first and second cooling fans (40 and 45) which are fixed to an axial end surface of the Lundell type core and generate cooling air along with rotation of the rotor; and a fan base (50) which is disposed between the second cooling fan and the Lundell type core and regulates the cooling air. In the alternating current generator for vehicles, the Lundell type core includes a plurality of U-shaped clearances (36) formed in an outer periphery of the axial end surface, being spaced apart from each other in the circumferential direction, and the fan base includes a plurality of large-diameter portions (53a to 53c) and small-diameter portions (54a to 54c) alternately disposed in the circumferential direction, with at least one small-diameter portion being disposed confronting the U-shaped clearance in the axial direction.

The Lundell type core provided to the alternating current generator for vehicles of the present disclosure includes a plurality of U-shaped clearances formed in the outer periphery of an axial end surface, being spaced apart from each other in the circumferential direction. The fan base provided to the alternating current generator for vehicles of the present disclosure includes a plurality of large-diameter portions and small-diameter portions alternately disposed in the circumferential direction, with at least one of the small-diameter portions being disposed confronting a U-shaped clearance in the axial direction. Namely, in each of the positions where the small-diameter portion of the fan base confronts a U-shaped clearance of the Lundell type core, the radially inner portion of the U-shaped clearance is confronted by the small-diameter portion of the fan base, and the radially outer portion of the U-shaped clearance is open. With this configuration, the cooling air blown in the axial direction from the cooling fan to the U-shaped clearances along with the rotation of the rotor is less regulated by the fan base. In short, the alternating current generator for vehicles of the present disclosure can reduce the fan function of the disk portion having the U-shaped clearances. Therefore, the alternating current generator for vehicles of the present disclosure can reduce pitch noise by unevenly and circumferentially arranging the portions in which the regulating performance of the fan base is lowered. Further, the alternating current generator for vehicles of the present disclosure can maintain the structure in which the claw poles of the Lundell type core are arranged at equal angular intervals. Thus, the alternating current generator for vehicles of the present disclosure raises no new problem of causing magnetic flux leakage or increasing the manufacturing cost.

It should be noted that the reference signs in parentheses corresponding to the members and portions described in the present section indicate correspondence with the specific members and portions in the embodiments described hereinafter, and should not be construed as limiting the scope of the present disclosure.

DESCRIPTION OF THE PRESENT EMBODIMENTS

With reference to FIGS. 1 to 4, hereinafter will be described an embodiment of an alternating current generator for vehicles of the present disclosure.

First Embodiment

Figure 1:
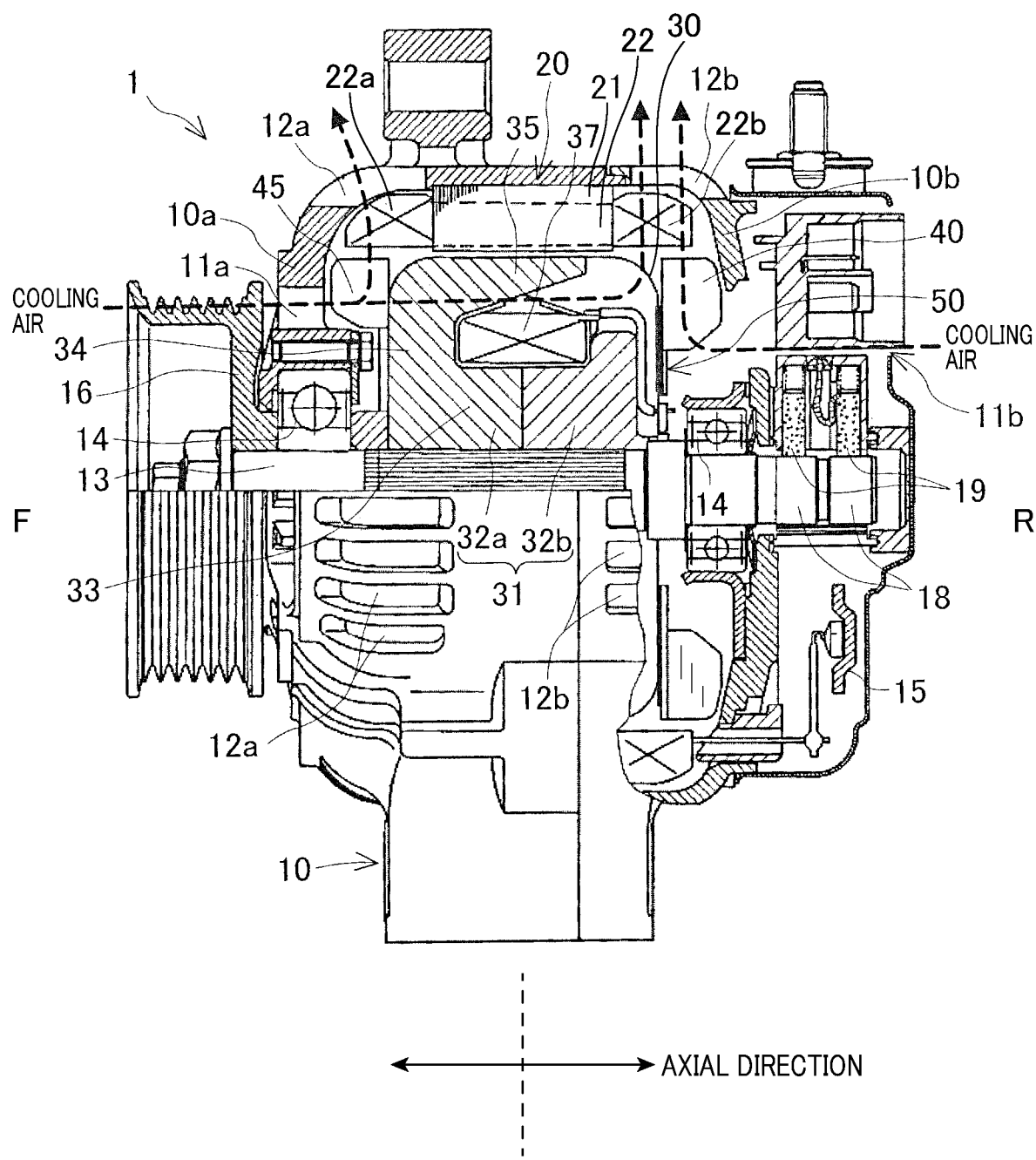
FIG. 1 is a front elevational view illustrating an alternating current generator for vehicles, including a partial cross section, according to a first embodiment.

As shown in FIG. 1, an alternating current generator 1 for vehicles according to the present embodiment includes a housing 10, a stator 20 and a rotor 30. The stator 20 serves as an armature. The rotor 30 includes a Lundell type core 31 disposed facing the inner periphery of the stator 20, and a magnetic field winding 37 to thereby serve as a field magnet. Further, the alternating current generator 1 for vehicles of the present embodiment includes first and second cooling fans 45 and 40, and a fan base 50. The first and second cooling fans 45 and 40 are fixed to an axial end surface of the Lundell type core 31 to generate cooling air along with the rotation of the rotor 30. The fan base 50 is arranged between the second cooling fan 40 and the Lundell type core 31 to regulate the cooling air. Further, the alternating current generator 1 for vehicles of the present embodiment includes a rectifier 15 for converting AC power to DC power.

The housing 10 is formed into a cylindrical shape with a bottomed cylindrical front housing 10a and a bottomed cylindrical rear housing 10b being jointed together at open ends thereof. The front housing 10a and the rear housing 10b respectively have an axially front-end surface (F side end surface of FIG. 1) and an axially rear-end surface (R side end surface of FIG. 1) which are provided with intake holes 11a and 11b, respectively, for the cooling air. The intake holes 11a and 11b take in the cooling air from outside into the housing 10. Further, the front housing 10a and the rear housing 10b are provided with discharge holes 12a and 12b, respectively, for the cooling air. The discharge holes 12a and 12b are provided to portions facing coil ends 22a and 22b of an armature winding 22, which project from both axial ends of the stator core 21.

The stator 20 includes a stator core 21 and the armature winding 22. The stator core 21 has a plurality of slots arranged in the circumferential direction. The armature winding 22 is wound in the slots of the stator core 21. The stator 20 is arranged by a given fixing method on the outer side of the rotor 30 via a predetermined air gap. Methods of fixing the stator 20 include, for example, a method of sandwiching the stator between the front housing 10a and the rear housing 10b, a method of fastening the stator to the front housing 10a with a bolt, and the like.

The rotor 30 integrally rotates with a shaft 13 that is rotatably supported by the front housing 10a and the rear housing 10b via a pair of bearings 14. The rotor 30 includes the Lundell type core 31 and the magnetic field winding 37. The magnetic field winding 37 is wound about the Lundell type core 31. The shaft 13 has a front-side end (F side end of FIG. 1) to which a pulley 16 is fixed while being connected, via a belt or the like, to an engine that is installed in the vehicle and used for traveling.

Figure 3:
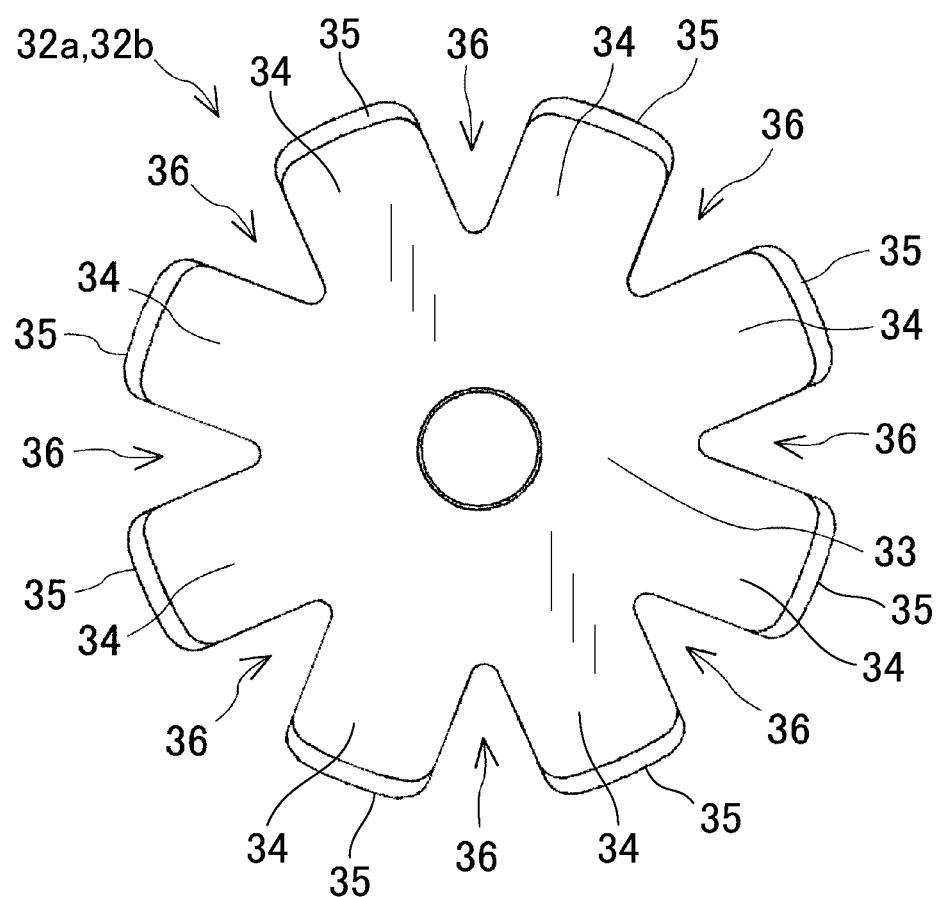
FIG. 3 is a front elevational view illustrating a pole core, as seen from an axially rear side, according to the first embodiment.

The Lundell type core 31 is configured by combining a front-side pole core 32a (F side of FIG. 1) and a rear-side pole core 32b (R side of FIG. 1). Namely, the Lundell type core 31 is configured by combining the front- and rear-side pole cores 32a and 32b having different magnetic polarities as a pair. The pole cores 32a and 32b include a boss portion 33, a disk portion 34 extending radially from the axial end surface of the boss portion 33, and a plurality (eight in the present embodiment) of claw poles 35 extending from the outer periphery of the disk portion 34 towards the boss portion 33 along the axial direction. The boss portion 33 is fitted and secured to the outer periphery of the shaft 13 and formed into a cylindrical shape. As shown in FIG. 3, the pole cores 32a and 32b have an axial end surface on the disk portion 34 side. The axial end surface has an outer periphery where U-shaped clearances 36 are formed each being located between circumferentially adjacent claw poles 35. In the present embodiment, eight U-shaped clearances 36 are formed at equal angular intervals in the circumferential direction.

Returning to FIG. 1, the pole cores 32a and 32b are assembled in a state in which the respective claw poles 35 are permitted to alternately face each other. Further, the pole cores 32a and 32b are assembled sandwiching the magnetic field winding 37 from both sides in the axial direction (both the F and R sides of FIG. 1). The magnetic field winding 37 is configured by winding an insulated copper wire coaxially and cylindrically. The magnetic field winding 37 is wound about the outer peripheral surface of the boss portion 33 of the pole cores 32a and 32b through this kind of assembly. The pole cores 32a and 32b of the Lundell type core 31 of the present embodiment each have eight claw poles 35. Therefore, a total of 16 magnetic poles are formed in the present embodiment.

The front-side pole core 32a has a front-side end surface to which the first cooling fan 45 is fixed by welding. Along with the rotation of the rotor 30, the first cooling fan 45 blows the cooling air taken up from the front-side intake hole 11a in the axial direction and the radial direction. Further, the rear-side pole core 32b has a rear-side end surface to which the second cooling fan 40 is fixed by welding. Along with the rotation of the rotor 30, the second cooling fan 40 blows the cooling air taken up from the rear-side intake hole 11b in the radial direction.

Figure 2:
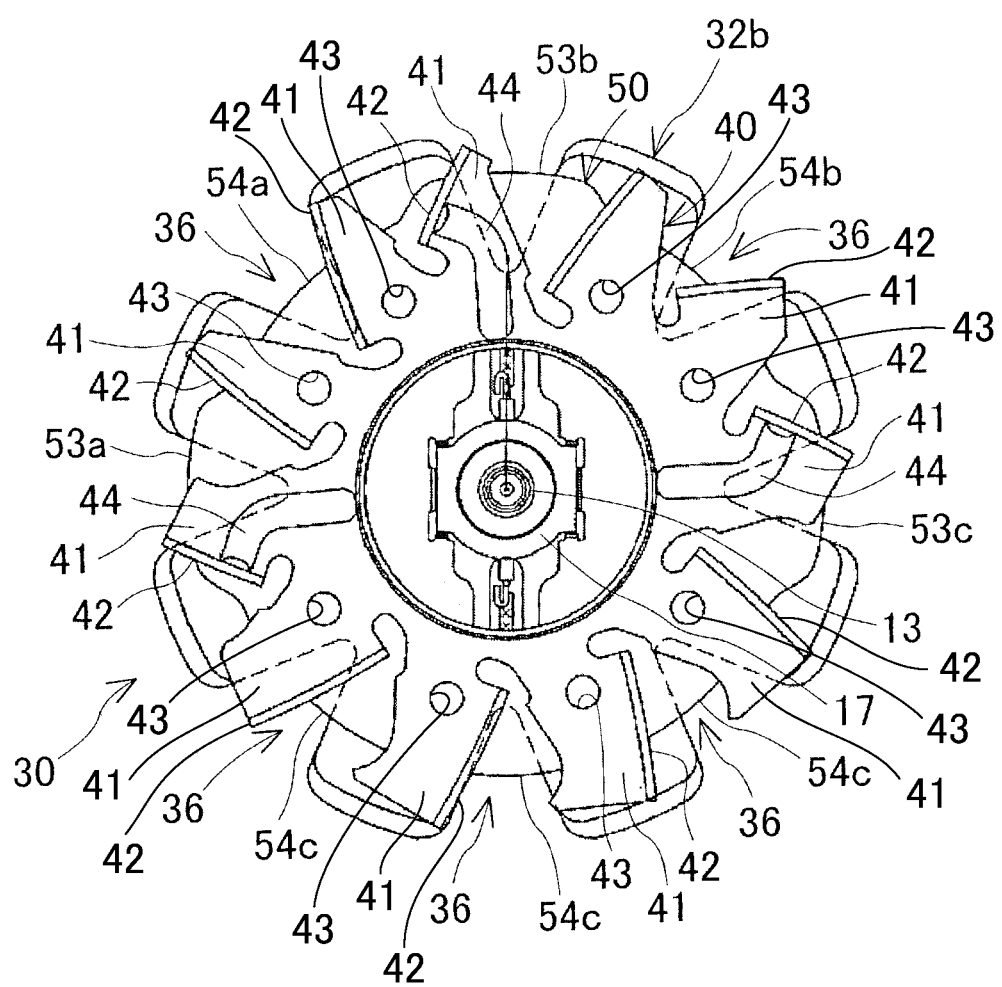
FIG. 2 is a front elevational view illustrating a fan base and a cooling fan secured to a rotor, as seen from an axially rear side, according to the first embodiment.

As shown in FIG. 2, the shaft 13 has an outer peripheral surface which is provided with a holding member 17. The second cooling fan 40 includes a plurality of support portions 41 extending in the radial direction and a plurality of fan blades 42 supported by the respective support portions 41. The plurality of fan blades 42 are supported by the respective support portions 41 and are arranged being spaced apart from each other in the circumferential direction. In the present embodiment, eleven of the support portions 41 and the fan blades 42 are provided. The shape and size (area) of the fan blades 42 are irregular and unequal. Thus, wind noise of a specific frequency (pitch noise) can be prevented in the present embodiment. Of the eleven support portions 41, eight (a plurality of) support portions 41a are provided with welding parts 43. The welding parts 43 each serve as a region for fastening the second cooling fan 40 to the rear-side end surface of the rear-side pole core 32b. On the other hand, the three support portions 41 not provided with the welding parts 43 are each provided with a reinforcing rib 44. Normally, the number of fan blades 42 is different from the number of claw poles 35 of the pole cores 32a and 32b to prevent pitch noise (noise) from concentrating on a specific frequency range.

Figure 4:
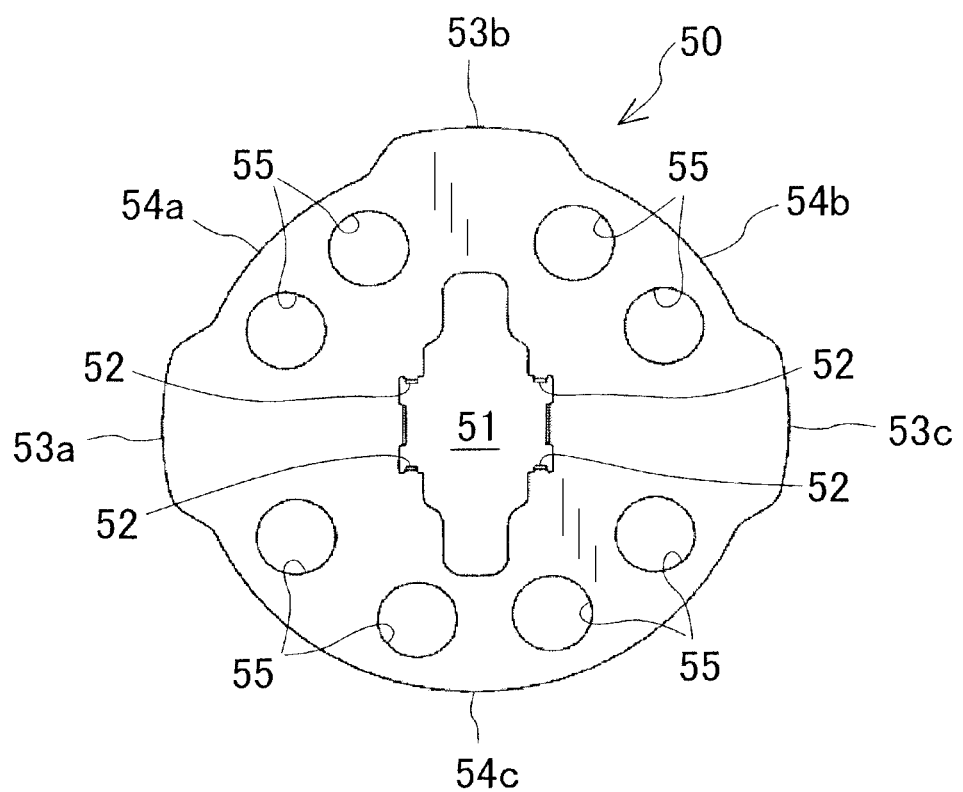
FIG. 4 is a front elevational view illustrating the fan base, according to the first embodiment.

As shown in FIG. 4, the fan base 50 is a metal plate formed into an annular shape. The fan base 50 has a center portion in which an aperture 51 is formed penetrating in the axial direction to insert the shaft 13 therethrough. The aperture 51 has an edge where engaging portions 52 are formed at four positions. The engaging portions 52 serve as members for establishing an engagement with the holding member 17 provided to the outer peripheral surface of the shaft 13.

The fan base 50 includes first to third small-diameter portions 54a to 54c with a small outer diameter and first to third large-diameter portions 53a to 53c with a large outer diameter, which are alternately formed in the circumferential direction. The first to third large-diameter portions 53a to 53c are formed so as to have a circumferential width of a predetermined angle range, and are arranged at unequal angular intervals (irregular pitch) in the circumferential direction. In the present embodiment, the angular interval between the first and second large-diameter portions 53a and 53b is about 90°. Similarly, the angular interval between the second and third large-diameter portions 53b and 53c is also about 90°. Therefore, the angular interval between the first and third large-diameter portions 53a and 53c is about 180°.

The first to third large-diameter portions 53a to 53c have a maximum outer diameter smaller than the outer diameter of the Lundell type core 31. Thus, in the present embodiment, the fan effect of the disk portion 34 of the pole cores 32a and 32b is suppressed to obtain the effect of reducing pitch noise (noise). Further, the fan base 50 is provided with eight through holes 55 penetrating in the axial direction so as to be located at positions corresponding to the respective welding parts 43 provided to the second cooling fan 40. The through holes 55 are each formed so as to have a circular cross section with a diameter larger than that of each welding part 43.

Returning to FIG. 1, the fan base 50 is fastened to the pole core 32b by welding the welding parts 43 of the second cooling fan 40 to the pole core 32b in a state in which the fan base 50 is sandwiched between the rear-side pole core 32b and the second cooling fan 40. Thus, the fan base 50 is held and fixed between the pole core 32b and the second cooling fan 40. In this case, the fan base 50 is arranged so that at least one of the first to third small-diameter portions 54a to 54c confronts a U-shaped clearance 36 of the rear-side pole core 32b in the axial direction.

As shown in FIG. 2, in the present embodiment, the first to third small-diameter portions 54a to 54c are arranged so as to confront the U-shaped clearances 36 of the rear-side pole core 32b in the axial direction. Namely, in the U-shaped clearances 36 facing the first to third small-diameter portions 54a to 54c, only the radially inner portions are confronted by the fan base 50, and the radially outer portions are open. Thus, the regulating performance of the fan base 50 is lowered for the cooling air blown in the axial direction from the U-shaped clearances 36 towards the fan base 50. In the fan base 50 of the present embodiment, portions in which the regulating performance is lowered as described above are unevenly arranged in the circumferential direction.

Further, the first to third large-diameter portions 53a to 53c of the fan base 50 are arranged at positions corresponding to the fan blades 42 which are supported by the respective support portions 41 that are not provided with the welding parts 43 of the second cooling fan 40.

In this case, the fan blades 42 supported by the respective support portions 41 not provided with the welding parts 43 have a small centrifugal strength compared to the fan blades 42 supported by the respective support portions 41 provided with the welding parts 43. Therefore, the present embodiment achieves further reinforcement with the first to third large-diameter portions 53a to 53c of the fan base 50, together with the reinforcing rib 44 provided to the support portions 41.

Returning to FIG. 1, the shaft 13 has a rear-side end portion on which the second cooling fan 40 and the fan base 50 are mounted. Further, the rear-side end portion of the shaft 13 is formed with a slip ring 18 electrically connected to both ends of the magnetic field winding 37. Thus, electric power is supplied to the magnetic field winding 37 from a brush device 19 via the slip ring 18.

In the alternating current generator 1 for vehicles of the present embodiment having the aforementioned configuration, when torque is transmitted from the engine to the pulley 16 via a belt or the like, the rotor 30 rotates in a predetermined direction together with the shaft 13. In this state, the alternating current generator 1 for vehicles of the present embodiment causes the brush device 19 to apply an exciting voltage to the magnetic field winding 37 of the rotor 30 via the slip ring 18. As a result, in the alternating current generator 1 for vehicles of the present embodiment, the claw poles 35 of the pole cores 32a and 32b are excited, and NS magnetic poles are alternately formed along the circumferential direction of the rotor 30. Accordingly, the alternating current generator 1 for vehicles of the present embodiment can cause the armature winding 22 to generate a three-phase AC voltage. As a result, the alternating current generator 1 for vehicles of the present embodiment can extract a predetermined DC current from the output terminal of the rectifier 15.

Further, as stated above, in the alternating current generator 1 for vehicles of the present embodiment, rotation of the rotor 30 together with the shaft 13 simultaneously generates rotation of the first and second cooling fans 40 and 45, thereby generating the cooling air in the directions indicated by the dashed line arrows of FIG. 1. In this case, the first cooling fan 45 blows the cooling air taken up from the front-side intake hole 11a in the axial direction and the radial direction. The cooling air blown in the radial direction by the first cooling fan 45 cools the front-side coil end 22a of the armature winding 22 and is discharged from the discharge hole 12a. It should be noted that the air in the axial direction may be blown by allowing at least one or more blades of the first cooling fan 45 to incline at an angle of less than 90° relative to the end surface of the disk portion 34 of the front-side pole core 32a to push the cooling air. Alternatively, the air in the axial direction may be blown by setting the angle of the blades of the first cooling fan 45 to 90° to exert fan function less than that exerted by the U-shaped clearances 36 between the second cooling fan 40 and the disk portion 34 of the rear-side pole core 32b.

Further, the cooling air blown in the axial direction by the first cooling fan 45 flows through the U-shaped clearances 36 each formed between the claw poles 35 adjacent in the circumferential direction of the Lundell type core 31 to cool the magnetic field winding 37. Then, the cooling air blown in the axial direction hits upon the fan base 50 for regulation to the radial direction, cools the rear-side coil end 22b of the armature winding 22, and is discharged from the discharge hole 12b. In the present embodiment, the first to third small-diameter portions 54a to 54c of the fan base 50 are arranged so as to axially confront the U-shaped clearances 36 of the rear-side pole core 32b. Therefore, the cooling air which is blown in the axial direction from the U-shaped clearances 36 to the fan base 50 is less regulated by the fan base 50. In this way, in the present embodiment, the portions in which the regulating performance of the fan base 50 is lowered are unevenly disposed in the circumferential direction. Thus, pitch noise (noise) is efficiently reduced in the present embodiment.

The second cooling fan 40 radially blows the cooling air taken in from the rear-side intake hole 11b. Thus, the cooling air blown in the radial direction cools the rear-side coil end 22b of the armature winding 22 and is discharged from the discharge hole 12b. As stated above, the alternating current generator 1 for vehicles of the present embodiment cools the heat generated in the housing 10 during operation, by use of the first and second cooling fans 40 and 45 and the fan base 50.

In the alternating current generator 1 for vehicles of the present embodiment, at least one of the first to third small-diameter portions 54a to 54c of the fan base 50 is arranged so as to axially confront a U-shaped clearance 36. In this way, in the alternating current generator 1 for vehicles of the present embodiment, the portions in which the regulating performance of the fan base 50 is lowered are unevenly arranged in the circumferential direction. This arrangement enables the alternating current generator 1 for vehicles of the present embodiment to efficiently reduce pitch noise (noise). Further, the alternating current generator 1 for vehicles of the present embodiment maintains the structure of arranging the claw poles 35 of the Lundell type core 31 at equal angular intervals. This structure enables the alternating current generator 1 for vehicles of the present embodiment to prevent the occurrence of magnetic flux leakage and the increase of the manufacturing cost.

In the alternating current generator 1 for vehicles of the present embodiment, the first to third large-diameter portions 53a to 53c of the fan base 50 are arranged at unequal angular intervals (irregular pitch) in the circumferential direction. This arrangement enables the alternating current generator 1 for vehicles of the present embodiment to prevent concentration of pitch noise (noise) on a specific frequency range.

In the alternating current generator 1 for vehicles of the present embodiment, the fan base 50 is fastened to the pole core 32b by welding the welding parts 43 of the second cooling fan 40 to the pole core 32b in a state in which the base 50 is sandwiched between the rear-side pole core 32b and the second cooling fan 40. Thus, in the alternating current generator 1 for vehicles of the present embodiment, the fan base 50 is held and fixed between the pole core 32b and the second cooling fan 40. As a result, the alternating current generator 1 for vehicles of the present embodiment can prevent the increase of the manufacturing cost and ensure fastening of the fan base 50.

In the alternating current generator 1 for vehicles of the present embodiment, the fan base 50 is provided with the through holes 55 penetrating in the axial direction at positions where the second cooling fan 40 and the Lundell type core 31 are welded. In this way, the alternating current generator 1 for vehicles of the present embodiment can prevent the increase of the manufacturing cost and ensure fastening of the fan base 50 with a simple structure.

In the alternating current generator 1 for vehicles of the present embodiment, the first to third large-diameter portions 53a to 53c of the fan base 50 are arranged at positions facing the fan blades 42 of the second cooling fan 40, which are supported by the respective support portions 41 not provided with the welding parts 43. The fan blades 42 supported by the respective support portions 41 provided with the welding parts 43 have a small centrifugal strength compared to the fan blades 42 supported by the respective support portions 41 not provided with the welding parts 43. Therefore, in the present embodiment, reinforcement is further ensured by the first to third large-diameter portions 53a to 53c of the fan base 50, together with the reinforcing rib 44 provided to the support portions 41. With this configuration, the alternating current generator 1 for vehicles of the present embodiment can increase the centrifugal strength of the fan blades 42 of the second cooling fan 40, which are supported by the respective support portions 41 not provided with the welding parts 43.

In the alternating current generator 1 for vehicles of the present embodiment, the first to third large-diameter portions 53a to 53c of the fan base 50 has a maximum outer diameter smaller than the outer diameter of the Lundell type core 31 (pole cores 32a and 32b). With this configuration, the alternating current generator 1 for vehicles of the present embodiment suppresses the fan effect of the disk portion 34 of the pole cores 32a and 32b to achieve the effect of reducing pitch noise (noise).

Other Embodiments

The alternating current generator 1 for vehicles of the present disclosure should not be construed as being limited to the aforementioned embodiment, but may be modified in various ways within a scope not departing from the specific technical object and spirit of the present disclosure.

For example, in the fan base 50 of the aforementioned embodiment, the angular interval between the first and second large-diameter portions 53a and 53b is set to 90°, and the angular interval between the second and third large-diameter portions 53b and 53c is set to 90°. Further, the angular interval between the first and third large-diameter portions 53a 53c is set to 180°. However, the angular intervals between the large-diameter portions are not limited to these angular intervals. The angular intervals between the large-diameter portions may be all different from each other. In the case of such different angular intervals, a sufficient reduction effect of pitch noise (noise) can be further obtained. Further, the number of large-diameter portions and small-diameter portions can be selected as desired as long as the number is two or more.

REFERENCE SIGNS LIST

1 . . . Alternating current generator for vehicles, 20 . . . Stator, 22 . . . Armature winding, 30 . . . Rotor, 31 . . . Lundell type core, 32a . . . Front-side pole core, 32b . . . Rear-side pole core, 36 . . . U-shaped clearance, 37 . . . Magnetic field winding, 40 . . . Second cooling fan, 41 . . . Support portion, 42 . . . Fan blade, 43 . . . Welding part, 45 . . . First cooling fan, 50 . . . Fan base, 53a to 53c . . . First to third large-diameter portions, 54a to 54c . . . First to third small-diameter portions, 55 . . . Through hole.

The invention claimed is:

1. An alternating current generator for vehicles comprising:
   a stator about which an armature winding is wound;
   a rotor including a Lundell type core disposed facing the inner periphery of the stator and a magnetic field winding wound about the Lundell type core;
   first and second cooling fans which are fixed to an axial end surface of the Lundell type core and generate cooling air along with rotation of the rotor; and
   a fan base which is formed separately from the first and second cooling fans, and is disposed between the second cooling fan and the Lundell type core and regulates the cooling air, wherein:
   the Lundell type core includes a plurality of U-shaped clearances formed in an outer periphery of the axial end surface, being spaced apart from each other in the circumferential direction; and
   the fan base includes a plurality of large-diameter portions and small-diameter portions alternately disposed in the circumferential direction, with at least one small-diameter portion being disposed confronting the U-shaped clearance in the axial direction.

2. The alternating current generator for vehicles according to claim 1, wherein the large-diameter portions are arranged at uneven intervals in a circumferential direction.

3. The alternating current generator for vehicles according to claim 2, wherein the angular intervals between the large-diameter portions are all different from each other.

4. The alternating current generator for vehicles according to claim 1, wherein the fan base is held between the Lundell type core and the second cooling fan by welding and fastening the second cooling fan to the Lundell type core in a state in which the fan base is sandwiched between the Lundell type core and the second cooling fan.

5. The alternating current generator for vehicles according to claim 4, wherein the fan base has a through hole penetrating in an axial direction at a position where the second cooling fan and the Lundell type core are welded.

6. The alternating current generator for vehicles according to claim 1, wherein
   the second cooling fan includes a plurality of support portions extending in a radiation direction, and a plurality of fan blades supported by the respective support portions and disposed being spaced apart from each other in the circumferential direction, the support portions being each provided with a welding part to which the Lundell type core is welded; and
   the large-diameter portions are disposed at positions facing the fan blades supported by the respective support portions not provided with the welding parts.

7. The alternating current generator for vehicles according to claim 1, wherein the fan base has a maximum outer diameter smaller than an outer diameter of the Lundell type core.

* * * * *